US009402374B2

(12) United States Patent  
Landon

(10) Patent No.: US 9,402,374 B2  
(45) Date of Patent: Aug. 2, 2016

(54) CONTAINER FOR HOLDING AND DISPENSING SOLID OR LIQUID REFRESHMENT, AND RELATED SYSTEMS AND METHODS

(71) Applicant: Daniel Landon, Woodinville, WA (US)

(72) Inventor: Daniel Landon, Woodinville, WA (US)

(*) Notice: Subject to any disclaimer, the term of this patent is extended or adjusted under 35 U.S.C. 154(b) by 0 days.

(21) Appl. No.: 13/648,106

(22) Filed: Oct. 9, 2012

(65) Prior Publication Data

US 2013/0087559 A1 Apr. 11, 2013

Related U.S. Application Data

(60) Provisional application No. 61/545,355, filed on Oct. 10, 2011.

(51) Int. Cl.

| | | |
|---|---|---|
| *A45F 3/16* | (2006.01) | |
| *A45F 3/46* | (2006.01) | |
| *A47K 1/08* | (2006.01) | |
| *A47K 1/09* | (2006.01) | |
| *A61M 15/00* | (2006.01) | |
| *B05B 11/00* | (2006.01) | |
| *A01K 7/00* | (2006.01) | |
| *A01K 5/01* | (2006.01) | |
| *B65D 25/00* | (2006.01) | |
| *B65D 25/24* | (2006.01) | |

(52) U.S. Cl.  
CPC ............... *A01K 7/00* (2013.01); *A01K 5/0114* (2013.01); *Y10T 29/49826* (2015.01)

(58) Field of Classification Search  
CPC ....... A01K 5/01; A01K 5/0107; A01K 7/005; A45F 3/16; A45F 3/46

USPC ......... 220/23.4, 574, 737; 206/218, 547, 217; 215/DIG. 7

See application file for complete search history.

(56) References Cited

U.S. PATENT DOCUMENTS

| | | | | |
|---|---|---|---|---|
| 1,373,155 | A | * | 3/1921 | Tebbetts ................... 206/217 |
| 1,373,156 | A | * | 3/1921 | Tebbetts ................... 206/546 |
| 3,072,285 | A | * | 1/1963 | Aileo ......................... 220/326 |
| 4,450,966 | A | * | 5/1984 | Villavicencio et al. ....... 206/547 |
| 4,573,434 | A | | 3/1986 | Gardner |
| 4,651,679 | A | | 3/1987 | Fassauer |
| 4,899,693 | A | * | 2/1990 | Arnold ..................... 119/28.5 |
| 4,984,723 | A | * | 1/1991 | Hsu ......................... 224/148.4 |
| 5,056,424 | A | * | 10/1991 | Lai ............................. 99/339 |
| 5,123,558 | A | * | 6/1992 | Moloney ................... 220/212 |
| 5,301,829 | A | * | 4/1994 | Chrisco ..................... 220/521 |
| D356,469 | S | * | 3/1995 | Musilli et al. ............... D7/507 |
| D360,338 | S | * | 7/1995 | Westgerdes ................ D7/511 |
| 5,535,889 | A | | 7/1996 | Lin |

(Continued)

*Primary Examiner* — Fenn Mathew  
*Assistant Examiner* — Andrew T Kirsch  
(74) *Attorney, Agent, or Firm* — Janeway Patent Law PLLC; John M. Janeway

(57) ABSTRACT

A container for holding and dispensing liquid or solid refreshment, includes a bottle and a bowl releasably coupleable to the bottle. The bottle includes a first side, a second side, a top and a bottom, that together define a cavity for holding refreshment, wherein the top includes an opening through which refreshment may pass to leave the cavity. The bowl includes a floor, a side and a wall, that together, define a cavity, wherein when the bowl is releasably coupled to the bottle: 1) the floor covers completely the bottle's first side, 2) the side covers completely the bottle's bottom, and 3) the wall extends over the bottle's second side. The container also includes a cap releasably coupleable to the bottle's top to prevent refreshment from passing through the top's opening.

13 Claims, 5 Drawing Sheets

(56) References Cited

U.S. PATENT DOCUMENTS

| | | | |
|---|---|---|---|
| 5,636,592 A * | 6/1997 | Wechsler | 119/52.1 |
| 5,681,019 A * | 10/1997 | Boyce | A01K 9/00 248/103 |
| 5,730,081 A | 3/1998 | Tsengas | |
| 5,809,935 A | 9/1998 | Kolterman | |
| 5,823,136 A * | 10/1998 | Zarski | 119/61.56 |
| 5,947,056 A * | 9/1999 | Zarski | 119/61.56 |
| 5,960,741 A * | 10/1999 | Ballen et al. | 119/72 |
| 5,960,742 A * | 10/1999 | O'Rourke et al. | 119/74 |
| D423,736 S * | 4/2000 | O'Rourke et al. | D30/132 |
| 6,079,361 A * | 6/2000 | Bowell et al. | 119/72 |
| 6,119,628 A | 9/2000 | Lorenzana | |
| 6,405,675 B1 * | 6/2002 | Mills | 119/74 |
| 6,463,880 B1 | 10/2002 | Callingham | |
| 6,467,428 B1 | 10/2002 | Andrisin | |
| D468,489 S * | 1/2003 | Wechsler | D30/132 |
| 6,718,911 B2 * | 4/2004 | Greenberg | 119/51.5 |
| D496,222 S * | 9/2004 | Kleckauskas et al. | D7/507 |
| 7,287,487 B2 * | 10/2007 | Hurwitz | 119/74 |
| 7,490,577 B2 | 2/2009 | Stephanos | |
| 7,527,017 B1 * | 5/2009 | Cribb | 119/51.5 |
| 7,690,329 B2 * | 4/2010 | Parks | 119/74 |
| 7,699,025 B2 | 4/2010 | Ho | |
| 7,971,552 B1 | 7/2011 | Rakoczy | |
| 8,016,157 B2 * | 9/2011 | Norris et al. | 221/286 |
| D647,369 S * | 10/2011 | Bryman et al. | D7/507 |
| 8,272,351 B2 * | 9/2012 | Hurwitz | 119/74 |
| 8,402,722 B2 * | 3/2013 | Buesching | 53/420 |
| 2003/0052018 A1 * | 3/2003 | Wilson | 206/217 |
| 2007/0017452 A1 * | 1/2007 | Hurwitz et al. | 119/74 |
| 2007/0079762 A1 * | 4/2007 | Stephanos | 119/74 |
| 2010/0122660 A1 | 5/2010 | Willett | |

* cited by examiner

US 9,402,374 B2

CONTAINER FOR HOLDING AND DISPENSING SOLID OR LIQUID REFRESHMENT, AND RELATED SYSTEMS AND METHODS

CROSS REFERENCE TO RELATED APPLICATIONS AND CLAIM OF PRIORITY

This application claims priority from commonly owned U.S. Provisional Patent Application No. 61/545,355 filed 10 Oct. 2012, titled "Portable Bottle/Bowl Combination for Holding and Providing Solid or Liquid Refreshment as Desired", which is presently pending and incorporated by reference.

BACKGROUND

Many enjoy the outdoors with their pets. For example, many walk through a forest or hike a mountain with their dog to get some exercise, listen to nature's sounds, and/or breathe some fresh air. Because such walks and hikes often involve physical exertion, many people carry with them refreshment, either liquid such as water or solid such as food, in a container for themselves and their pets. Some containers are simply a bottle that one can use to pour refreshment into one's mouth. Unfortunately, though, providing refreshment for one's dog from such a bottle is awkward and often results in spilling much of the refreshment onto the ground.

In response to this difficulty, some bottle's have a tray attached to them that one can use to distribute refreshment to one's dog by pouring the refreshment into the tray and allowing one's dog access to the tray to consume the refreshment. Unfortunately, though, such trays are often also awkward to use for a couple of reasons. Many trays remain attached to the bottle when being used to distribute refreshment to the dog, and thus are easily knocked over by the dog while in use. To provide more stability to such bottle/bowl combinations, one typically holds the bottle and tray while the dog consumes the refreshment from the tray.

Other trays that are used to facilitate refreshing one's pets may be separated from the bottle while in use. These trays, however, are typically designed to match the contour of the bottle that they are attachable to to make the bottle/tray combination easy to carry and pack. Because of this, such trays often have a curved bottom or floor that matches the curved side of the bottle that they're attached to. Thus, such trays are not stable when placed on the ground to provide one's dog refreshment, and thus such trays are often held by a person while the dog consumes the refreshment from the tray.

Therefore there is a need for a container that one can use to refresh both himself/herself and his/her pet, that one can easily carry and pack away, and that one does not have to hold while one's pet consumes their refreshment.

SUMMARY

In an aspect of the invention, a container for holding and dispensing liquid or solid refreshment, includes a bottle and a bowl that is releasably coupleable to the bottle. The bottle includes a first side, a second side, a top and a bottom, that together define a cavity for holding refreshment, wherein the top includes an opening through which refreshment may pass to leave the cavity. The bowl includes a floor, a side and a wall, that together define a cavity, wherein when the bowl is releasably coupled to the bottle: 1) the floor covers completely the bottle's first side, 2) the side covers completely the bottle's bottom, and 3) the wall extends over the bottle's second side.

The container also includes a cap releasably coupleable to the bottle's top to prevent refreshment from passing through the top's opening.

In some embodiments, the bottle's top includes groove; the bowl's wall includes a boss positioned on the wall and configured to extend into the groove when the bowl is releasably coupled to the bottle; and a portion of the wall extends from the bowl's side and contacts the bottle's second side when the bowl is releasably coupled to the bottle. By retaining the bowl's boss in the bottle's groove, and contacting the bottle's second side with a portion of the bowl's wall, the bowl is releasably coupled to the bottle.

Also, in some embodiments the bowl's floor is rectangular and substantially flat. This allows the bowl, with refreshment in its cavity, to lie stable on the ground or rock or other structure while ones pets consumes refreshment from the bowl.

DETAILED DESCRIPTION

Figure 1:
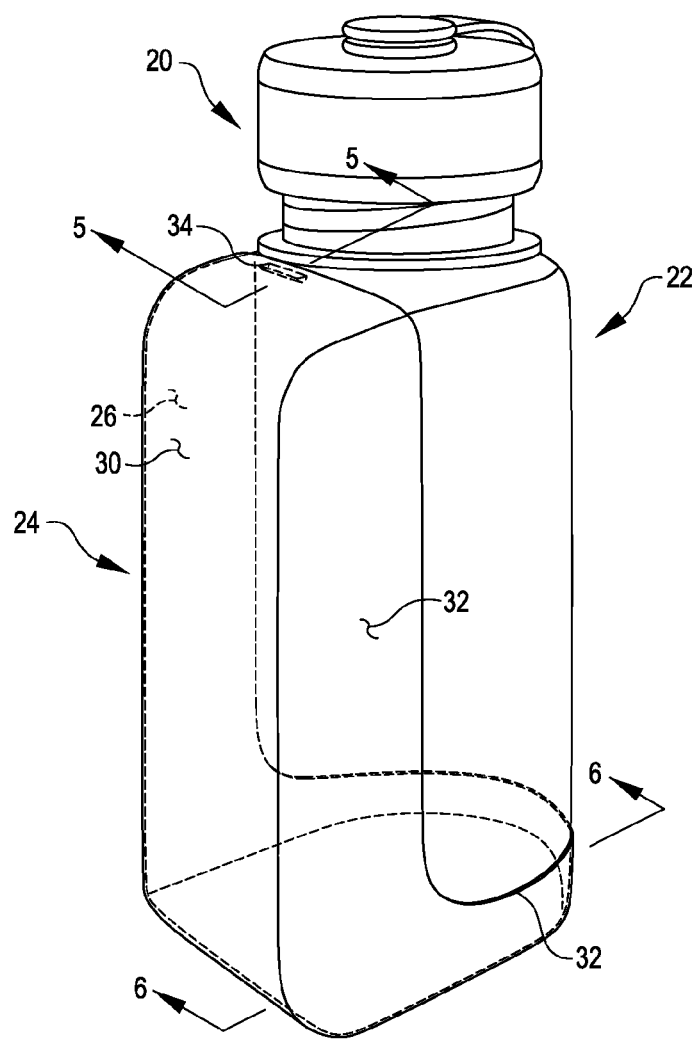
FIG. 1 is a perspective view of a container according to an embodiment of the invention.
Figure 2:
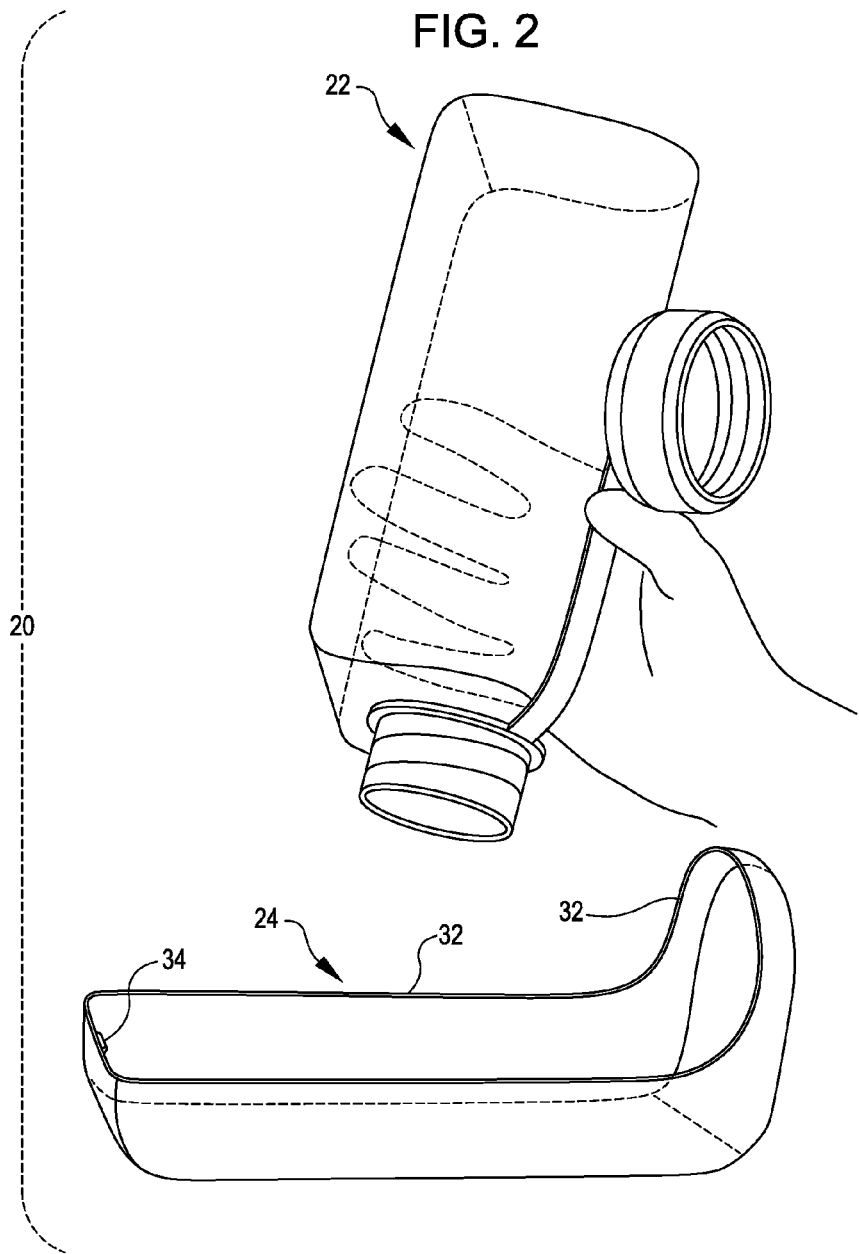
FIG. 2 is a perspective view of the container shown in FIG. 1 showing the bottle of the container separated from the bowl of the container and positioned for use, according to an embodiment of the invention.

FIGS. 1 and 2 are perspective views of a container 20, according to an embodiment of the invention. The container 20 includes a bottle 22 to hold solid refreshment (not shown), such as food for one's pet, or liquid refreshment, such as water for one's pet. The container 20 also includes a bowl 24 that is releasably coupled to the bottle 22, and that can be used to facilitate dispensing the solid or liquid refreshment. For example, if one uses the container 20 to hold and dispense water for one's dog, then, when one wants to provide water for the dog, one first separates the bowl 24 from the bottle 22. Then, one opens the bottle 22 and pours the water into the bowl 24. Then, one positions the bowl 24 to allow the dog to drink water from it.

Figure 3:
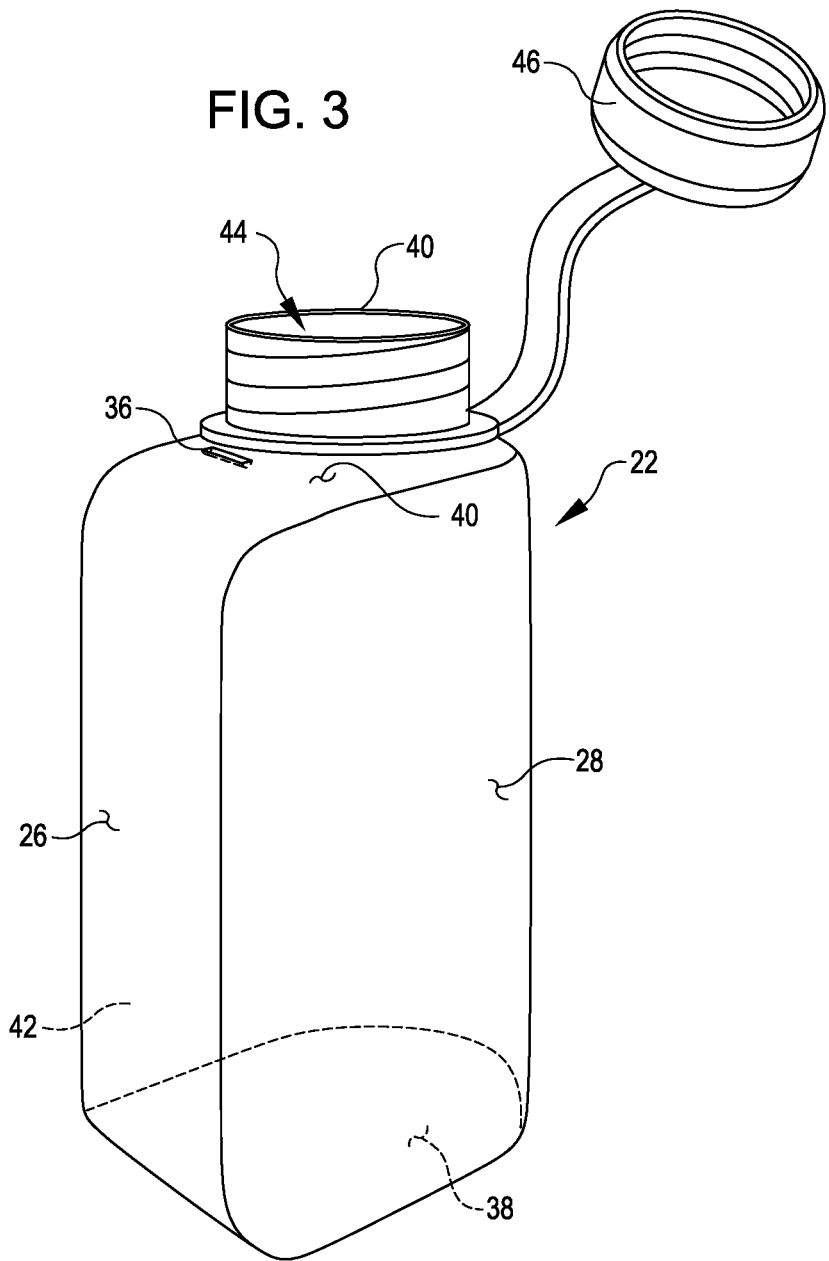
FIG. 3 is a perspective view of the bottle shown in FIGS. 1 and 2, according to an embodiment of the invention.

As discussed in greater detail in conjunction with FIG. 3, the bottle 22 includes a first side 26 and a second side 28. And as discussed in greater detail in conjunction with FIG. 4, the bowl 24 includes a floor 30 that extends the length of the first side 26, and a wall 32 that extends over the bottle's second side 28 when the bowl 24 is releasably coupled to the bottle 22. In this and other embodiments, the bowl 24 includes a substantially flat floor 30 and is releasably coupled to the bottle 22 by a portion of the wall 32 contacting a region of the bottle's second side 28, and a boss 34 (more clearly shown in FIG. 5) of the bowl 24 extending into the groove 36 (more clearly shown in FIG. 5) of the bottle 22. With the boss 34 and groove 36 positioned at one end of the bottle 22, and a portion of the wall 32 contacting a region of the bottle 22 located at the other end of the bottle (here diagonally), the bowl 24 may be releasably, yet securely, coupled to the bottle 22. And, with the floor 30 being substantially flat, one can place the bowl 22 on the ground, a rock, or other structure to allow a pet to drink or eat from it without worrying about the pet tipping the bowl 24 and spilling its contents.

FIG. 3 is a perspective view of the bottle 22 shown in FIGS. 1 and 2, according to an embodiment of the invention. The bottle 22 includes the first side 26, the second side 28, a bottom 38, and a top 40, that together define a cavity 42 that holds solid or liquid refreshment (not shown). The bottle 22 also includes an opening 44 through which refreshment may pass to enter or leave the cavity 42, and a cap 46 releasably coupleable to the bottle's top 40 to prevent refreshment from passing through the opening 44.

In this and other embodiments of the bottle 22, the top 40 includes the groove 36 (discussed in greater detail in conjunction with FIG. 5) that receives the boss 34 (also discussed in greater detail in conjunction with FIG. 5) of the bowl 24 to help releasably couple the bowl 24 to the bottle 22. In other embodiments of the bottle 22, the first side 26 may include the groove 36, or the second side 28 may include the groove 36. In still other embodiments of the bottle 22, one or more of the following: the top 40, the first side 26 and the second side 28 may include one or more grooves 36 to help releasably, yet securely, couple the bowl 24 to the bottle 22.

The bottle 22 may include any desired shape, and the cap 46 may include any desired mechanism to allow the refreshment in the bottle to be dispensed from the bottle when open, and to seal the refreshment inside the bottle 22 when closed. For example, in this and other embodiments, the bottle 22 includes a cylinder with a flat side and has a volume of about 32 ounces, and the cap 46 threading engages the top 40 to prevent refreshment from leaving the cavity 42. More specifically, the first side 26 is rectangular and substantially flat, while the second side 28 is cylindrical in shape. And, the cap 46 includes a silicone seal (not shown) that seals the interface between the cap 46 and the top 40 when the cap 42 closes the opening 44.

Other embodiments are possible. For example, the bottle 12 may have a volume greater than or less than 32 ounces. Furthermore, the shape of the bottle 12 may be spherical or rectangular.

Still referring to FIG. 3, the bottle 22 and cap 46 may include any desired material capable of holding the desired solid or liquid refreshment without permitting the solid or liquid refreshment to leak from the bottle 22. For example, in this and other embodiments, the bottle 22 includes copolyester plastic that does not include Bisphenol A (BPA), and the cap 22 includes a conventional plastic.

Figure 4:
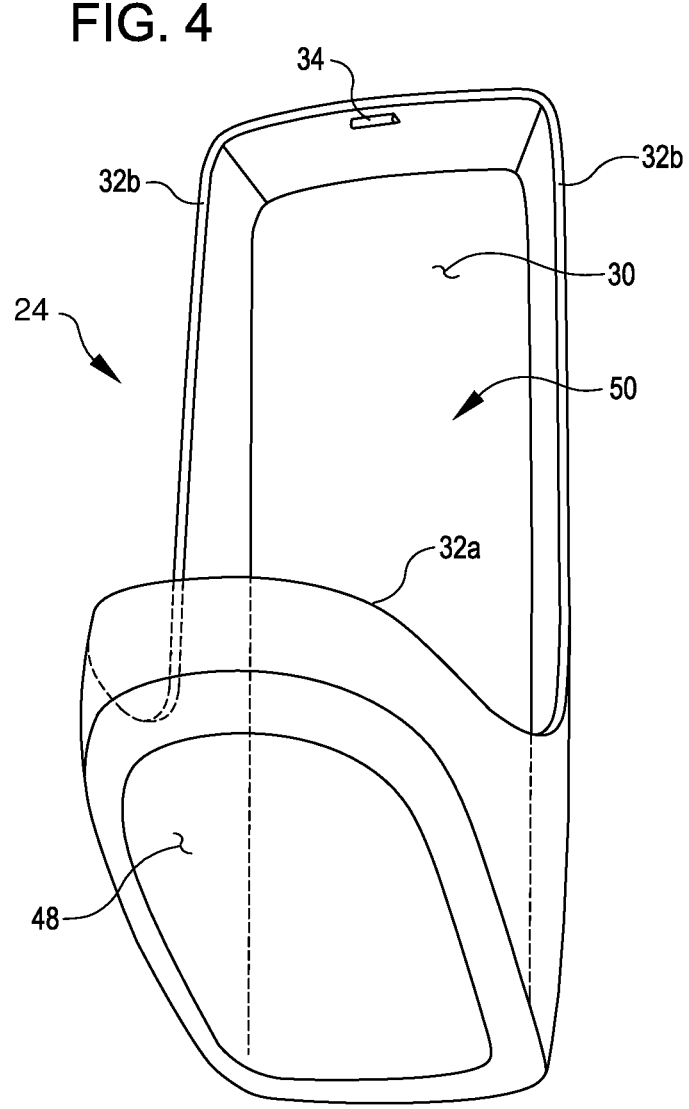
FIG. 4 is a perspective view of the bowl shown in FIGS. 1 and 2, according to an embodiment of the invention.

FIG. 4 is a perspective view of the bowl 24 shown in FIGS. 1 and 2, according to an embodiment of the invention. The bowl 24 includes the floor 30, a side 48, and the wall 32, that together define a cavity 50 that may be used to facilitate dispensing the solid or liquid refreshment.

The bowl 24 may include any desired shape that corresponds to a portion of the bottle's shape. For example, in this and other embodiments, the bowl 24 includes a shape that closely mimics the size and shape of a portion of the bottle 22. More specifically, the floor 30 is rectangular, substantially flat, and sized to snugly cover the bottle's first side 26 when the bowl 24 is releasably coupled to the bottle 22. In this configuration the bottle's first side 26 nests in the bowl's cavity 50 next to the floor 30, when the bowl 24 is releasably coupled to the bottle 22. Similarly, the bowl's side 48 closely mimics the shape of the bottle's bottom 38 and is sized to snugly cover the bottle's bottom 38 when the bowl 24 is releasably coupled to the bottle 22. In this configuration the bottle's bottom 38 nests in the bowl's cavity 50 next to the bowl's side 48, when the bowl 24 is releasably coupled to the bottle 22.

The wall 32 may extend from the bowl's floor 30 and the bowl's side 48 in any desired direction, and for any desired length. For example, in this and other embodiments of the bowl 24, the wall 32 includes a first portion 32a and a second portion 32b. The first portion 32a extends in a direction that is perpendicular or substantially perpendicular to the surface of the side 48 for about 0.5 inches. The second portion 32b extends in a direction that is perpendicular or substantially perpendicular to the surface of the floor 30 for about 1.5 inches from the bowl's floor 30. In this configuration the wall 32 extends over less than 25% of the area of the bottle's second side 28, and when the bowl 24 is releasably coupled to the bottle 22 friction between the wall's second portion 32b and the bottle's second side 28 helps hold the bowl 24 to the bottle 22. In addition, the volume of the bowl's cavity 50 that holds the refreshment while one's pet consumes it from the bowl 24 is substantially the area of the floor multiplied by the length of the wall's second portion 32b (here 1.5 inches). Also, in this configuration, when the bowl 24 is releasably coupled to the bottle 22, the bulk of the combination is substantially identical to the bulk of the bottle 22 without the bowl 24 releasably coupled. Thus, the combination of the bottle 22 and the bowl 24 remains easy to pack and transport.

Other embodiments are possible. For example, the shape of the bowl 24 may not closely mimic the size and shape of the bottle 22, and the wall 32 may extend from the bowl's floor 30 and bowl's side 48 in a direction other than perpendicular from the surface of the respective floor 30 and side 48. In such embodiments, a region of the wall's first portion 32a that extends over the second side 28 adjacent the bottle's bottom 38 may extend perpendicular to the bowl's side 48 to help hold the bowl 24 to the bottle 22 when the bowl 24 is releasably coupled to the bottle 22. In other embodiments that do not include a portion of the wall 32 configured as such the container 20 may include a strap or any other desired mechanism that holds the bowl 24 to the bottle 22, such as a strap.

Still referring to FIG. 4, the bowl 24 may include any desired material capable of holding the desired solid or liquid refreshment without permitting the solid or liquid refreshment to leak from the bowl 24. For example, in this and certain other embodiments, the bowl 24 includes copolyester plastic that does not include Bisphenol A (BPA).

Figure 5:
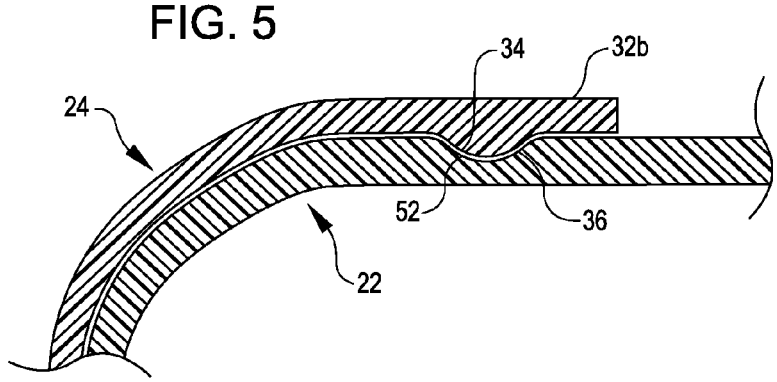
FIG. 5 is a partial, cross-sectional view of the container shown in FIG. 1, according to an embodiment of the invention.
Figure 6:
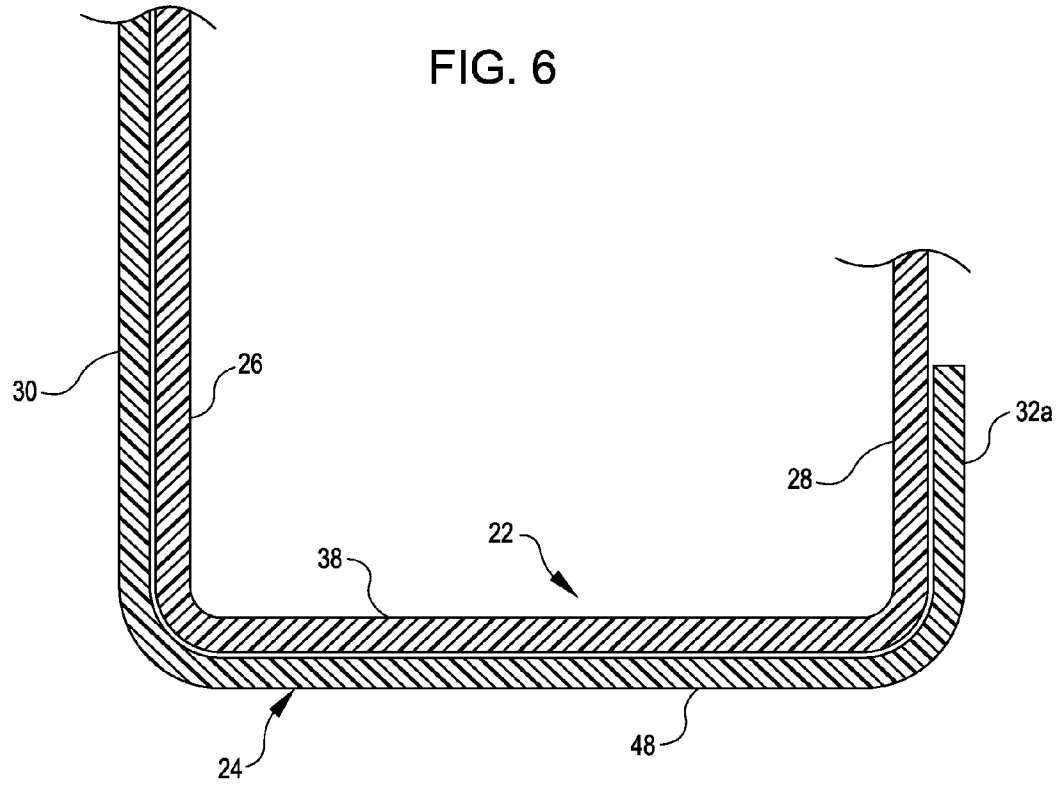
FIG. 6 is another partial, cross-sectional view of the container shown in FIG. 1, according to an embodiment of the invention

FIGS. 5 and 6 are partial, cross-sectional views of the container 20 shown in FIG. 1, according to an embodiment of the invention. FIG. 5 shows the boss 34 of the bowl 24 extending into the groove 36 of the bottle's top 40, when the bowl 24 is releasably coupled to the bottle 22, and FIG. 6 shows a first portion 32a of the wall 32 contacting a region of the bottle's second side 28, when the bowl 24 is releasably coupled to the bottle 22. Together, this combination releasably couples the bowl 22 to the bottle 22.

The location of the boss 34 and groove 36 relative to the second portion 32b of the wall 32 that contacts the bottle's second side 28 may be anywhere desired. For example, in this and other embodiments, the bowl's boss 34 and the bottle's groove 36 are located at a top end of the container 10, and the first portion 32a of the bowl's wall 32 contacts a region of the bottle's second side 28 that is located at a bottom end of the container 10 and diagonal from the location of the boss 34 and groove 36. In this configuration the first portion 32a of the wall 32 prevents the bowl 24 from sliding out from under the bottle's bottom 38, and the groove 36 hinders the movement of the boss 34, and thus the floor 30, away from the bottle's first side 26. To separate the bowl 24 from the bottle 22, one can exert a force that urges the bowl's floor 30 away from the bottle's first side 26. As the force increases, the boss 34 rides up a slope 52 of the groove 36 and causes the portion of the bowl 24 near the boss 34 to slightly bend away from the bottle's top 40. When the boss 34 no longer extends into the groove 36, the bowl 24 may be pivoted away from the bottle 22 until the bottle's bottom 38 can be withdrawn away from the bowl's side 48. Thus, the opposite and diagonal position of the boss 34 and groove 36 relative to the first portion 32a of the wall 32 that contacts a region of the bottle 22 adjacent the bottle's bottom 38 allows the bowl 24 to be releasably, yet securely, coupled to the bottle 22.

As previously mentioned, other embodiments are possible. For example, the bowl may be releasably coupled to the bottle with a strap that one can wrap around the bowl 24 and the bottle 22 when the bowl 24 is adjacent the bottle 22. As another example, the bowl 24 may not include a boss 34 and the bottle 22 may not include a groove 36. In such embodiments, the bowl may be configured to frictionally engage the bottle's top 40, second side 28 and bottom 38.

The preceding discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A container for holding and dispensing liquid or solid refreshment, the container comprising:
    a bottle including a first side, a second side, a top and a bottom, that together define a cavity for holding refreshment, wherein the top includes an opening through which refreshment may pass to leave the cavity;
    a cap releasably coupleable to the bottle's top to prevent refreshment from passing through the top's opening; and
    a bowl releasably coupleable to the bottle, the bowl including a floor, a side and a wall having a first portion and a second portion, wherein the floor, the side and the second portion of the wall, together, define a cavity, and wherein when the bowl is releasably coupled to the bottle:
        the bowl's floor covers completely the bottle's first side,
        the bowl's side covers completely the bottle's bottom,
        the first portion of the bowl's wall extends from the bowl's side, over the bottle's second side such that a region of the bowl wall's first portion that is farthest from the bowl's floor lies parallel to the bowl's floor and contacts the bottle's second side, and
        the second portion of the bowl's wall extends from the bowl's floor, and includes a region that extends over the bottle's top such that:
            only the region of the bowl wall's second portion extends over the bottle's top,
            none of the region of the bowl wall's second portion extends far enough away from the bowl's floor to start around the bottle's opening, and
            a section of the region of the bowl wall's second portion contacts the bottle's top, such that a line extending from the contact of the region of the bowl wall's first portion to the contact of the section of the region of the bowl wall's second portion forms a diagonal through the bottle's cavity that crosses the bottle's opening, to releasably couple the bowl to the bottle.

2. The container of claim 1 wherein the second portion of the bowl's wall that extends from the bowl's floor contacts the bottle's second side to releasably couple the bowl to the bottle.

3. The container of claim 1 wherein:
    the bottle's top includes a groove, and
    the second portion of the bowl's wall includes a boss positioned on the wall and configured to extend into the groove when the bowl is releasably coupled to the bottle.

4. The container of claim 1 wherein the bottle's first side and the bowl's floor each have substantially identical shapes and areas such that bottle's first side is disposed in the bowl's cavity and nests adjacent the bowl's floor when the bowl is releasably coupled to the bottle.

5. The container of claim 1 wherein the bottle's bottom and the bowl's side each have substantially identical shapes and areas such that bottle's bottom nests adjacent the bowl's side when the bowl is releasably coupled to the bottle.

6. The container of claim 1 wherein:
    the bottle's first side and the bowl's floor each have substantially identical shapes and areas such that bottle's first side is disposed in the bowl's cavity and nests adjacent the bowl's floor when the bowl is releasably coupled to the bottle, and
    the bottle's bottom and the bowl's side each have substantially identical shapes and areas such that bottle's bottom nests adjacent the bowl's side when the bowl is releasably coupled to the bottle.

7. The container of claim 1 wherein the bowl's floor is rectangular.

8. The container of claim 1 wherein the bowl's floor is rectangular and substantially flat.

9. The container of claim 1 wherein the bowl's side is cylindrical.

10. The container of claim 1 wherein:
    the bowl's floor is rectangular and substantially flat, and
    the bowl's side is cylindrical.

11. The container of claim 1 wherein the wall extends over less than 25% of bottle's second side.

12. A method for holding and dispensing liquid or solid refreshment, the method comprising:
    releasably coupling a bowl to a bottle having a top, a cavity and an opening, such that:
        a floor of the bowl covers completely a first side of the bottle,
        a side of the bowl covers completely a bottom of the bottle,
        a first portion of the bowl's wall extends from the bowl's side over the bottle's second side such that a region of the bowl wall's first portion that is farthest from the bowl's floor lies parallel to the bowl's floor and contacts the bottle's second side, and
        a second portion of the bowl's wall extends from the bowl's floor, and includes a region that extends over the bottle's top such that:
            only the region of the bowl wall's second portion extends over the bottle's top,
            none of the region of the bowl wall's second portion extends far enough away from the bowl's floor to start around the bottle's opening, and
            a section of the region of the bowl wall's second portion contacts the bottle's top, such that a line extending from the contact of the region of the bowl wall's first portion to the contact of the section of the region of the bowl wall's second portion forms a diagonal through the bottle's cavity that crosses the bottle's opening, to releasably couple the bowl to the bottle.

13. The method of claim 12 wherein releasably coupling the bowl to the bottle includes:
extending a boss positioned on a second portion of the bowl's wall into a groove in a top of the bottle, and
the second portion of the bowl's wall that extends from the bowl's side contacting the second side of the bottle.

* * * * *